United States Patent [19]

Etchu et al.

[11] Patent Number: 5,431,983
[45] Date of Patent: Jul. 11, 1995

[54] MAGNETIC RECORDING TAPE COMPRISING A POLYETHYLENE-2,6-NAPTHALATE SUBSTRATE, MAGNETIC METAL THIN FILM, AND A BACKCOAT LAYER

[75] Inventors: Masami Etchu, Yokohama; Hisashi Hamano, Sagamihara; Masahiro Hosoi, Tokyo; Ieyasu Kobayashi; Yasuhiro Saeki, both of Sagamihara, all of Japan

[73] Assignee: Teijin Limited, Osaka, Japan

[21] Appl. No.: 288,897

[22] Filed: Aug. 10, 1994

Related U.S. Application Data

[63] Continuation of Ser. No. 82,836, Jun. 28, 1993, abandoned, which is a continuation-in-part of Ser. No. 873,111, Apr. 24, 1992, abandoned.

[30] Foreign Application Priority Data

Apr. 25, 1991 [JP] Japan ................................. 3-121762

[51] Int. Cl.⁶ ............................................... G11B 5/00
[52] U.S. Cl. ..................... 428/141; 428/215; 428/323; 428/336; 428/339; 428/457; 428/458; 428/480; 428/694 T; 428/694 TB; 428/694 SL; 428/694 SG; 428/900; 204/192.2
[58] Field of Search ............... 428/144, 213, 336, 480, 428/694 T, 694 TB, 694 SL, 694 SG, 900, 141, 215, 339, 323, 458, 457; 204/192.2

[56] References Cited

U.S. PATENT DOCUMENTS

| | | | |
|---|---|---|---|
| 3,993,824 | 11/1976 | Shirahata et al. | 428/216 |
| 4,255,516 | 3/1981 | Katoh et al. | 430/533 |
| 4,497,865 | 2/1985 | Minami et al. | 428/336 |
| 4,505,966 | 3/1985 | Adachi et al. | 428/141 |
| 4,670,319 | 6/1987 | Katoh et al. | 428/141 |
| 4,734,326 | 3/1988 | Nishimatsu et al. | 428/328 |
| 4,804,736 | 2/1989 | Utsumi et al. | 528/176 |
| 5,051,292 | 9/1991 | Katoh et al. | 428/141 |
| 5,098,773 | 3/1992 | Saito et al. | 428/212 |
| 5,208,091 | 5/1993 | Yanagita et al. | 428/141 |

FOREIGN PATENT DOCUMENTS 0345644 12/1989 European Pat. Off. .

OTHER PUBLICATIONS

Japanese Patents Gazette, Section CH, Week 8711,. Derwent Publications Ltd., London, UK. Abstract of Japanese Laid-Open Patent Publication No. 62-028918 Feb. 1987.

*Primary Examiner*—Stevan A. Resan
*Attorney, Agent, or Firm*—Sherman and Shalloway

[57] ABSTRACT

A magnetic recording tape, in particular a VTR tape, comprising;
(A) a substrate composed of a biaxially oriented polyethylene-2,6-naphthalate film of which
  (a) the Young' modulus in the longitudinal direction is at least 650 kg/mm², the Young' modulus in a transverse direction is the same as, or greater than, the Young's modulus in the longitudinal direction,
  (b) the heat shrinkage in the transverse direction is in the range of 1.0 to 3.0% when treated at 100° C. for 30 minutes,
  (c) the surface roughness, Ra, is not more than 0.005 μm, and
  (d) the amount of bled-out oligomer is not more than 0.01 area % when treated in air at 160° C. for 5 minutes,
(B) a thin magnetic metal layer having a thickness of 100 to 1,500 nm and formed on one surface of the substrate, and
(C) a lubricant-containing thin organic polymer layer having a thickness of not more than 1 μm and formed on the other surface of the substrate, said lubricant being in the form of particles which have an average particle diameter of 0.1 to 2.0 μm. This magnetic recording tape has high coercive force and excellent running durability and is capable of recording data at high density and high sensitivity for a long period of time.

3 Claims, No Drawings

MAGNETIC RECORDING TAPE COMPRISING A POLYETHYLENE-2,6-NAPTHALATE SUBSTRATE, MAGNETIC METAL THIN FILM, AND A BACKCOAT LAYER

CROSS-REFERENCE TO RELATED APPLICATIONS

This application is a continuation of application Ser. No. 08/082,836, filed Jun. 28, 1993, now abandoned, which is in turn a continuation-in-part of Ser. No. 07/873,111, filed Apr. 24, 1992, now abandoned.

DETAILED DESCRIPTION OF THE INVENTION

The present invention relates to a magnetic recording tape. More specifically, it relates to an improved magnetic recording tape, in particular for VTR, which permits recording over a long time.

There is conventionally widely used a magnetic recording tape in which a magnetic layer composed mainly of γ-iron oxide and a polymer binder is formed on at least one surface of a biaxially oriented polyethylene terephthalate film. However, this conventional magnetic recording tape has the following defects.

(1) The coercive force for magnetic recording is low.

(2) With a decrease in the tape thickness, the tape deteriorates in running properties and durability, and recorded data is liable to drop out. As a result, the volume of the tape that can be wound or cased in a cassette having a predetermined size is limited, and recording for a lengthy period of time is not permitted, or the volume of recordable data cannot be increased.

For overcoming the above defects of the magnetic recording tape using a polyethylene terephthalate film as a substrate and for providing a magnetic recording tape improved in the running properties and durability, there has been proposed a magnetic recording tape in which a biaxially oriented polyethylene-2,6-naphthalate film having specific mechanical properties and a specific surface structure is used as a substrate, a magnetic layer composed of a thin metal layer is formed on one surface of the substrate, and a coating of an organic polymer containing a lubricant is formed on the other surface of the substrate (JP-A-62-28918). In the above magnetic recording tape, the film used as a substrate is a polyethylene-2,6-naphthalate film having a stress, at a 5% elongation in the longitudinal (machine) direction, of at least 18 kg/mm², a Young's modulus, in the longitudinal direction, of at least 800 kg/mm² and a Young's modulus, in the transverse (width) direction, of at least 500 kg/mm². This magnetic recording tape can definitely show an increase in the coercive force.

However, even the tape using the above film causes a problem in running properties and durability when the thickness of the tape is decreased for the purpose of increasing the recording and reproducing time. That is, the following problems arise. When this magnetic tape is repeatedly run, the tape side edges are injured to become wavy or crinkly and consequently, properties of the tape are damaged. Further, when a metal thin layer is formed on the film substrate, the substrate film curls. As a result, when data is magnetically recorded on the tape or when data on the tape in a cassette is reproduced, the tape can not make good contact with a magnetic head due to the curling so that it fails to give a sufficient output or the tape running is unstable.

It is an object of the present invention to overcome the above defects and provide a magnetic recording tape which is free from curling of the film substrate at the time of formation of a thin metal film, which has high coercive force for magnetic recording or is free from drop-out of data as a data-recorded tape, and which is excellent in running properties and durability even when it is produced as a tape having a small thickness.

Other objects and advantages of the present invention will be apparent from the following description.

According to the present invention, the above objects and advantages of the present invention are achieved by a magnetic recording tape comprising;

(A) a substrate composed of a biaxially oriented polyethylene-2,6-naphthalate film of which
  (a) the Young' modulus in the longitudinal direction is at least 650 kg/mm², the Young' modulus in a transverse direction is the same as, or greater than, the Young's modulus in the longitudinal direction,
  (b) the heat shrinkage in the transverse direction is in the range of 1.0 to 3.0% when treated at 100° C. for 30 minutes,
  (c) the surface roughness, Ra, is not more than 0.005 μm, and
  (d) the amount of bled-out oligomer is not more than 0.01 area % when treated in air at 160° C. for 5 minutes, (B) a thin magnetic metal layer having a thickness of 100 to 1,500 nm and formed on one surface of the substrate, and (C) a lubricant-containing thin organic polymer layer having a thickness of not more than 1 μm and formed on the other surface of the substrate, said lubricant being in the form of particles which have an average particle diameter of 0.1 to 2.0 μm.

In the biaxially oriented polyethylene-2,6-naphthalate film constituting the substrate of the magnetic recording tape of the present invention, the Young's modulus ($E_M$) in the longitudinal (machine) direction is required to be at least 650 kg/mm². It is preferably at least 700 kg/mm², more preferably at least 750 kg/mm². When the Young's modulus in the longitudinal direction is less than 650 kg/mm², the magnetic recording tape is undesirably elongated and deformed when a strong stress is instantaneously exerted thereon.

Further, in the above polyethylene-2,6-naphthalate film, the Young's modulus ($E_T$) in the transverse direction is required to be the same as, or greater than, the Young's modulus ($E_M$) in the longitudinal direction. When the Young's modulus ($E_T$) in the transverse direction is less than 650 kg/mm² or smaller than the Young's modulus ($E_m$) in the longitudinal direction, a repeatedly running tape is undesirably damaged and deformed on its side edge to become wavy or crinkly. The Young's modulus ($E_T$) in the transverse direction is preferably at least 700 kg/mm², more preferably at least 800 kg/mm².

In the above polyethylene-2,6-naphthalate film, the heat shrinkage in the transverse direction when the film is treated at 100° C. for 30 minutes is required to be in the range of 1.0 to 3.0%. When the heat shrinkage is less than 1.0% or larger than 3.0%, undesirably, the tape curls extraordinarily.

In the above polyethylene-2,6-naphthalate film, the surface roughness, Ra, is required to be not more than 0.005 μm. When the surface roughness, Ra, is larger than 0.005 μm, it means that a space between a magnetic head and the tape becomes large. As a result, undesirably, the electromagnetically transduced magnetism of the tape decreases, and a magnetic recording tape having high-density and high-sensitivity can not be obtained. The surface roughness can be adjusted by incorporating into a film substrate inert fine particles such as fine inorganic particles containing elements belonging to the groups IIA, IIB, IVA and IVB of the periodic table or fine particles of a polymer having high heat resistance such as a silicone resin and crosslinked polystyrene, or subjecting the film to other surface treatment such as coating treatment. When inert fine particles are incorporated, it is preferred to incorporate, for example, about 0.015% by weight (based on the polymer weight) of fine silica particles having an average particle diameter of 0.045 μm.

In the polyethylene-2,6-naphthalate film used in the present invention, the oligomer bleed-out amount when the film is treated in air at 160° C. for 5 minutes is required to be not more than 0.01 area %. When the amount of bled-out oligomer is greater than 0.01 area %, undesirably, the tape surface is roughened due to bled-out oligomer so that a magnetic recording tape having a high-density and high-sensitivity can not be obtained.

The above biaxially oriented polyethylene-2,6-naphthalate film used in the present invention can be produced by a known method. For example, it can be produced by a method in which polyethylene-2,6-naphthalate is melt-extruded, preferably at a temperature between its melting point (Tm: ° C.) and (Tm +70)° C., the resultant extrudate is solidified by cooling to obtain an unstretched film, the unstretched film is monoaxially (longitudinally or transversely) stretched at a predetermined stretching ratio at a temperature between (Tg −10)° C. and (Tg +70)° C. (in which Tg stands for the glass transition temperature of the polyethylene-2,6-naphthalate), then the monoaxially stretched film is stretched at right angles to the above stretching direction (e.g., in the transverse direction at the second stage when the film is stretched in the longitudinal direction at the first stage) at a predetermined stretching ratio at temperature between Tg (° C.) and (Tg +70)° C., and further, the resultant biaxially stretched film is thermally set. In the above method, the stretching ratio, stretching temperature, thermally setting conditions, and the like can be determined depending upon the properties of the above film. The area stretching ratio is 9 to 30 times, preferably 15 to 28 times. The thermally setting temperature is preferably in the range of 190° to 250° C. The treatment time is preferably in the range of 1 to 60 seconds.

The biaxially oriented polyethylene-2,6-naphthalate film can be also produced by a simultaneous biaxially stretching method besides the above consecutive blaxially stretching method. In the consecutive biaxially stretching method, the film may be stretched longitudinally and transversely more than once each. For example, the mechanical properties of the tape can be improved by thermally setting the above biaxially stretched film (not thermally set) at a thermal setting temperature between (Tg +20)° C. and (Tg +70)° C., stretching the thermally set film longitudinally or transversely at a temperature higher than the thermal setting temperature by 10° to 40° C., and further stretching the film transversely or longitudinally at a temperature higher than the above temperature by 20° to 50° C. to obtained a biaxially oriented film having a total stretched ratio in the longitudinal direction of 5.0 to 6.9 times and a total stretched ratio in the transverse direction of 5.0 to 6.9 times.

The heat shrinkage of a film having a high Young's modulus can be adjusted by heating the heat-treated film under low tension to relax it in the longitudinal direction. The film may be relaxed in the longitudinal direction by a method in which the film is relaxed by floating it in a non-contact state by means of air flow under heat and low tension, a method in which the film is relaxed by means of a velocity difference between a heating or non-heating roll having a nip roll and a cooling roll having a nip roll, or a method in which the film is relaxed by gradually slowing the movement rate of clips holding the film in a tenter.

The polyethylene-2,6-naphthalate used for producing the biaxially oriented polyethylene-2,6-naphthalate film as a substrate is known per se, and can be produced by a known method. Further, the inert fine particles can be incorporated into the polyethylene-2,6-naphthalate preferably by a method in which the inert fine particles are added or deposited during the synthesis of the polyethylene-2,6-naphthalate, or a method in which a master polymer containing a high concentration of the inert fine particles is prepared by the above method and mixed with a polymer containing no inert fine particles, and the resultant mixture is melt-extruded.

The magnetic recording tape of the present invention has the above biaxially oriented polyethylene-2,6-naphthalate film as a substrate and a thin magnetic metal recording layer on one surface thereof.

The magnetic metal which is to constitute the thin magnetic metal recording layer, i.e., magnetic layer is preferably selected from cobalt, iron, nickel, alloy of these, alloy of these with chromium or tungsten.

The thin metal layer can be formed by a wet method using vacuum vapor deposition according to electroless deposition or electrolytic deposition, or a dry method using sputtering or ion plating. In particular, a vacuum vapor deposition method is the most preferred as a method for forming the thin metal layer, since the deposition rate is remarkably large and a high coercive force can be obtained. Further, a sputtering method using cobalt or chromium is also preferred. The layer thickness is 100 to 1,500 nm (0.1 to 1.5 μm).

The magnetic recording tape of the present invention further has a thin layer of an organic polymer containing a lubricant on the other surface of the substrate, i.e., on the surface where the thin magnetic layer is not formed in order to maintain the smooth running properties. The lubricant preferably includes aluminum acrylate, molybdenum, fine silica and a fluorine resin. A magnetic recording tape having good lubricity or improved running properties can be obtained by dispersing the lubricant in a solution or emulsion containing an organic polymer having adhesiveness to the film substrate, and coating the substrate surface with the so-prepared dispersion. The organic polymer includes a polyether containing glycidyl ether of polyoxyalkylene glycol and a copolyester having as acid components naphthalene-2,6-dicarboxylic acid and minor amount of an aliphatic dicarboxylic acid. The thickness of the coating is not more than 1 μm, preferably approximately 50 to 500 nm. The surface roughness, Ra, of the coating is preferably 0.015 to 0.040 μm (15 to 40 nm). The average particle diameter of the above lubricant is 0.1 to 2.0 μm.

When the average particle diameter is smaller than 0.1 μm, no sufficient running properties of the vapor-deposition tape are obtained. That is, when the tape is running, it may stick or slip, it may show an increased running tension, or it may suffer a high friction against a running pin. Thus, the tape may not run smoothly. When the average particle diameter is greater than 2 μm, a back coating has a excessively rough surface, and protrusions on the rough surface are stamped on the magnetic layer to cause a dent surface on the magnetic layer. As a result, the electromagnetic characteristic deteriorates. And the amount of solid part thereof for use is preferably approximately 10 to 30% by weight (based on the binder weight).

The thickness of the magnetic recording tape of the present invention is preferably not more than 10 μm, further preferably 3 to 10 μm. When the thickness exceeds 10 μm, it is difficult to achieve the object of a long-play recording.

The present invention will be further described hereinafter by reference to Examples. The physical values and properties described in the present invention were measured and are defined as follows.

(1) Young's modulus

A film was cut into a sample having a width of 10 mm and a length of 15 cm. The sample was pulled with an Instron-type universal tensile tester in a distance of 100 mm between chucks at a pulling rate of 10 mm/minute at a charting rate of 500 mm/minute. The Young's modulus was calculated on the basis of a tangent in a start portion of the so-prepared load-elongation curve.

(2) Surface roughness (Ra)

Measured according to JIS B 0601. A chart (surface roughness curve) was prepared with a tracer method surface roughness tester (SURFCOM 3B) supplied by Tokyo Seimitsusha Co., Ltd. under conditions where the tracer radius was 2 μm and the load was 0.07 g. A portion having a measured length L was taken from the film surface roughness curve in the direction of its center line. The center line of this portion taken was assumed to be X axis and the direction of the longitudinal multiplication, Y axis, and the roughness curve was expressed as $Y=f(x)$. The value (Ra: μm) given by the following equation was defined as a film surface roughness.

$$Ra = \frac{1}{L} \int_0^L f(x)\, dx$$

In the present invention, the standard length was set at 0.25 mm, and the sample was measured in 8 places. The three largest measured values were excluded, and Ra was expressed in terms of an average of the remaining five measured values.

(3) Heat shrinkage

A film was cut into a strip having a width of 10 mm and a length of 600 mm, and marked on both ends of a distance of 500 mm thereon. The sample was heat-treated under no tension in a gear oven at 100° C. for 30 minutes, and then cooled to room temperature. The heat shrinkage was calculated on the basis of a dimensional change between the sample before the heat treatment and the sample after the heat treatment. The sample was measured with a microdimension measuring apparatus (Profile Projector Model PJ321F) supplied by Mitutoyo.

(4) Amount of bled-out oligomer

A film was heated in an air oven at 160° C. for 5 minutes, then taken out and cooled to room temperature. A photograph of the film surface scattered with bled-out oligomers was taken through a light transmission microscope having a magnifying power of 400 diameters. This photograph was image-processed with Luzex 500, and an area occupied by oligomer crystals in a visual field (the total of areas occupied by a plurality of oligomer crystals) was divided by an area of the visual field, and expressed by percentage.

(5) Coercive force

The magnetic properties such as magnetic recording were measured with a Vibration Sample Magnetometer (V.S.M.), and the coercive force was determined on the basis of the hysteresis curve thereof.

Samples having a coercive force of at least 500 Oe (Oersted) were taken as having an excellent coercive force, and samples having a coercive force of less than 500 Oe were taken as having an inferior coercive force.

(6) Drop out

A magnetic tape was allowed to continuously run for 100 hours with a home-use video tape recorder (helical scan). The tape was allowed to stand at 40° C. for 48 hours, and brought back to room temperature, and data was recorded thereon and reproduced, during which the number of drop-out portions where the signal output was 50% or less was counted with a drop-out counter.

For the counting, 10 reels of tapes, each of which has a width of ½ inch and a length of 780 m were used as one set, and those tapes having less than 1 drop-out portion or less per reel were taken as being excellent on drop-out, and those tapes having 2 or more drop-out portions were taken as being inferior on drop-out.

(7) Running properties of magnetic recording tape

A sample tape was set at a home-use video tape recorder (helical scan), and allowed to run for 100 hours by starting and stopping the tape repeatedly, during which the running state of the tape was examined and the output was measured. Tapes which satisfied all the following points were taken as having excellent running properties, and tapes other than these were taken as having inferior running properties.
  (i) The side edge of a tape neither bent nor became crinkly.
  (ii) The tape causes no running noise.
  (iii) The tape was free from splitting and rupture.

(8) Curling

Square samples having a size of 500×500 mm were taken from master rolls of a magnetic recording tape, and their curled states were classified to the following five ratings, in which D and E were taken as excellent on curling, and A, B and C were taken as defective on curling.
  A: Samples which took the form of a complete cylinder.
  B: Samples which were similar to those classified as A, but opened partly in the cylindrical form.
  C: Samples which opened more broadly than B, but had a side curve which formed part of a circle with the most distant portion of the side curve as a diameter.

D: Samples which opened more broadly than C, and had a side curve which did not form part of a circle with the most distant portion of the side curve as a diameter.

E: Samples completely or nearly free from curling.

EXAMPLE 1

Comparative Example 1

Pellets of polyethylene-2,6-naphthalate containing 0.05% by weight of silica having an average particle diameter of 0.15 μm and having an inherent viscosity of 0.60 were dried at 170° C. for 4 hours. The dried pellets were melt-extruded by a conventional method, and the extrudate was rapidly cooled to obtain an unstretched film having a thickness of 165 μm. Then, the unstretched film was consecutively biaxially stretched at 4.85 times at 130° C. in the longitudinal direction and at 5.2 times at 130° C. in the transverse direction. The biaxially stretched film was thermally set at 200° C. for 30 seconds to give a biaxially stretched film having a thickness of 6.4 μm (Example 1).

The above procedure (Example 1) was repeated except that the temperature for the thermal setting was changed to 245° C. to give a biaxially stretched film (Comparative Example 1).

In addition, before the above thermal setting, one surface of each of the films was coated with a coating liquid having the following contents.

Contents of the coating liquid:
  Aluminum acrylate (P-3, supplied by Asada Kagaku K.K.)
    2 wt % solution—12 kg
  Polyethylene glycol (supplied by Nippon Oil & Fats Co., Ltd., molecular weight 19,000)
    2 wt % solution—5 kg
  Polyethylene glycol diglycidyl ether (NEROIO, supplied by Nagase Sangyo K.K.)
    2 wt % solution—2 kg
  Polyoxyethylene nonyl phenyl ether
    2 wt % solution—1 kg
  Aqueous dispersion of colloidal silica
    (2 wt % aqueous dispersion of colloidal silica having an average particle diameter of 0.07–0.08 μm)—8.5 kg The wet coating amount was about 2.2 g/m², and the solid content was about 0.0126 g/m².

A Co-Ni layer (Co/Ni—75/25 weight ratio) having a thickness of 100 nm was formed on the other (uncoated) surface of each of the above polyethylene-2,6-naphthalate films by an electron beam vapor deposition method (oblique deposition of minimum incident angle 50°) to give master rolls for magnetic recording use.

Then, a back coat having a thickness of 500 nm was formed on the back surface of the films having Co-Ni layer by applying a back coating composition on it. The back coating composition has the following contents:
  Vinyl chloride/vinyl acetate copolymer
    (400X —110A, produced by NIPPON ZEON Co., LTD.)
    30 parts by weight
  Acrylonitrile-butadiene rubber
    (weight ratio 30:70, average molecular weight 300,000)
    15 parts by weight
  Polyisocyanate
    (Coronate L, produced by NIPPON POLYURETHANE CO., LTD.)
    25 parts by weight
  Calcium carbonate powder
    (average particle diameter 0.5 μm)
    150 parts by weight
  Methyl ethyl ketone
    650 parts by weight And the above ingredients were kneaded and dispersed in a ball mill for 12 hours to afford the back coating composition.

Magnetic recording tapes having Co-Ni layer on one surface and the back coating on the other surface were prepared.

Table 1 shows the properties of the tapes. The tape obtained in Example 1 was excellent in all the coercive force, drop-out and running properties. Meanwhile, in Comparative Example 1, the film curled extraordinarily when the above thin deposition film was formed thereon, and no tape exhibiting excellent performance could be produced.

Comparative Example 2

Polyethylene-2,6-naphthalate containing the same lubricant as that used in Example 1 was dried, melt-extruded by a conventional method and rapidly cooled on a casting drum to obtain an unstretched film having a thickness of 120 μm. The unstretched film was consecutively biaxially stretched at 4.5 times at 120° C. in the longitudinal direction and at 5.2 times at 130° C. in the transverse direction. Further, the biaxially stretched film was thermally set at 245° C. for 30 seconds to give a biaxially stretched film having a thickness of 6.4 μm.

Then, the above-obtained biaxially stretched film was treated in the same manner as in Example 1 to give a magnetic recording tape. Table 1 shows the properties of the tape. This tape had a high or excellent coercive force. Since, however, it extremely curled and had a low Young's modulus in the transverse direction, it was inferior in running properties and running durability.

EXAMPLE 2

An unstretched film was prepared in the same manner as in Example 1. The unstretched film was stretched in two-stage drawings, i.e. at 4.7 times at 125° C. in the longitudinal direction and then at 6.8 times at 125° C. in the transverse direction (at 5.0 times in the first stage and 1.36 times in the second stage). The biaxially stretched film was thermally set at 200° C. for 30 seconds to give a biaxially stretched film having a thickness of 6.4 μm.

Then, the above-obtained film was treated in the same manner as in Example 1 to give a magnetic recording tape. Table 1 shows the properties of the tape. This tape had a high coercive force, was free from occurrence of curling, and was excellent in dropout and running properties.

Comparative Example 3

A biaxially stretched film was prepared in the same manner as in Example 1 except that the thermal setting temperature was changed to 170° C., and a magnetic recording tape was prepared therefrom in the same manner as In Example 1. This magnetic recording tape showed the bleed-out of a large amount of oligomers. Therefore, its magnetic recording layer lost its flatness and drop-out occurred often. That is, this tape was defective. Table 1 shows the properties of the tape.

The present invention can provide a magnetic recording tape, particularly for a VTR, which has high coercive force and excellent running durability, which is completely or nearly free from surface defectiveness caused by bled-out oligomers, and which is capable of recording data at high density and high sensitivity for a long period of time.

EXAMPLE 3

An unstretched film was prepared in the same manner as in Example 1. The unstretched film was stretched in two-stage drawings, i.e. at 5.0 times at 125° C. in the longitudinal direction and then at 7.2 times at 125° C. in the transverse direction (at 5.0 times in the first stage and 1.44 times in the second stage). The biaxially stretched film was thermally set at 190° C. for 30 seconds to give a blaxially stretched film having a thickness of 6.4 μm.

Then, the above-obtained film was treated in the same manner as in Example 1 to give a magnetic recording tape. Table 1 shows the properties of the tape. This tape had a high coercive force, was free from occurrence of curling, and was excellent in dropout and running properties.

Comparative Examples 4 and 5

A biaxially stretched film and a magnetic recording tape were prepared in the same manner as in Example 1 except that the back coating composition containing calcium carboante powder having an average particle diameter of 0.08 μm (Comparative Example 4) or 2.5 μm (Comparative Example 5) was used. Table 1 shows the properties of the tape.

What is claimed is:

1. A magnetic recording tape comprising:
(A) a substrate composed of a biaxially oriented polyethylene-2,6-naphthalate film of which
   (a) the Young's modulus in the longitudinal direction is at least 650 kg/mm², the Young's modulus in a transverse direction is the same as, or greater than, the Young's modulus in the longitudinal direction,
   (b) the heat shrinkage in the transverse direction is in the range of 1.0 to 3.0% when treated at 100° C. for 30 minutes,
   (c) the surface roughness, $R_a$, is not more than 0.005 μm, and
   (d) the amount of bled-out oligomer is not more than 0.01 area % when treated in air at 160° C. for 5 minutes,
(B) a thin magnetic metal layer having a thickness of 100 to 1,500 nm and formed on one surface of the substrate by a vacuum vapor deposition or a sputtering method, and
(C) a lubricant-containing thin organic polymer layer having a thickness of not more than 1 μm and formed on the other surface of the substrate, said lubricant being in the form of particles which have an average particle diameter of 0.1 to 2.0 μm.

2. A magnetic recording tape according to claim 1, wherein the thin magnetic metal layer is formed from cobalt, iron, nickel, an alloy of these, or an alloy of these with chromium or tungsten.

3. A magnetic recording tape according to claim 1, which has a thickness of 10 μm or less.

TABLE 1

| | | | Film properties | | | | |
|---|---|---|---|---|---|---|---|
| | Inert fine particles | | Thickness | Young's modulus $E_M$ | Young's modulus $E_T$ | Heat Shrinkage (100° C. × 30 min. transverse | Amount of bled-out | Base surface roughness on vapor deposi- |
| Ex. or Comp. Ex. | Kind | Content (wt. %) | (μm) | (kg/mm²) | (kg/mm²) | direction) (%) | oligomers (%) | sion side Ra (μm) |
| Ex. 1 | Silica | 0.05 | 6.4 | 700 | 710 | 1.1 | 0.007 | 0.004 |
| Comp. Ex. 1 | " | " | " | " | " | 0.6 | 0.005 | " |
| Comp. Ex. 2 | " | " | " | 850 | 550 | 0.3 | " | " |
| Ex. 2 | " | " | " | 650 | 800 | 1.4 | 0.008 | " |
| Comp. Ex. 3 | " | " | " | 710 | 720 | 4.0 | 0.02 | " |
| Ex. 3 | " | " | " | 650 | 900 | 2.5 | 0.009 | " |
| Comp. Ex. 4 | " | " | " | 700 | 710 | 1.1 | 0.007 | " |
| Comp. Ex. 5 | " | " | " | " | " | " | " | " |

| Ex. or Co,p. Ex. | Back coating Average particle diameter (μm) | Magnetic tape properties | | | |
|---|---|---|---|---|---|
| | | Curling | Coersive force (Oe) | Drop-out | Running properties |
| Ex. 1 | 0.5 | E | 650 | excellent | excellent |
| Comp. Ex. 1 | " | B | " | excellent | excellent |
| Comp. Ex. 2 | " | A | " | excellent | inferior |
| Ex. 2 | " | E | 660 | excellent | excellent |
| Comp. Ex. 3 | " | A | " | inferior | excellent |
| Ex. 3 | " | E | 660 | excellent | excellent |
| Comp. Ex. 4 | 0.08 | E | 650 | inferior | inferior |
| Comp. Ex. 5 | 2.5 | E | bad | inferior | excellent |

* * * * *